United States Patent [19]

Reiss

[11] 4,354,857
[45] Oct. 19, 1982

[54] METHOD AND APPARATUS FOR SEPARATING GAS MOLECULES USING A BIPOLAR MEMBRANE AS A MOLECULAR SIEVE

[75] Inventor: Howard Reiss, La Jolla, Calif.

[73] Assignee: Occidental Research Corporation, Irvine, Calif.

[21] Appl. No.: 230,487

[22] Filed: Feb. 2, 1981

Related U.S. Application Data

[63] Continuation of Ser. No. 974,158, Dec. 28, 1978, abandoned.

[51] Int. Cl.³ .............................................. B01D 53/22
[52] U.S. Cl. ............................................. 55/6; 55/10; 55/16; 55/131; 55/158
[58] Field of Search ....................... 55/16, 131, 158, 4, 55/6, 7, 10; 210/321.1, 500.2, 502

[56] References Cited

U.S. PATENT DOCUMENTS

| 3,208,883 | 9/1965 | Crouthamel et al. | 55/16 X |
| 3,335,543 | 8/1967 | Robb et al. | 55/158 |
| 3,371,468 | 3/1968 | Shrodshire | 55/158 |
| 3,876,957 | 4/1975 | Thatcher | 55/16 X |
| 4,125,462 | 11/1978 | Latty | 210/500.2 |
| 4,161,013 | 7/1979 | Grodzinsky | 210/243 X |

FOREIGN PATENT DOCUMENTS 197353  5/1923  United Kingdom ................. 55/131

*Primary Examiner*—John Adee
*Attorney, Agent, or Firm*—Walter A. Hackler

[57] ABSTRACT

A monolithic bipolar membrane having elastic properties is wetted with a polar solvent or an electrolyte, such as water. An electric field is used to control the transfer rate of gas molecules through the membrane in response to an applied external electromotive force. By adjusting the electromotive force the membrane can be controlled to selectively pass one type of molecule while rejecting other molecules. A separation between molecules of two or more materials can thus be achieved.

15 Claims, 4 Drawing Figures

METHOD AND APPARATUS FOR SEPARATING GAS MOLECULES USING A BIPOLAR MEMBRANE AS A MOLECULAR SIEVE

This is a continuation of application Ser. No. 974,158, filed Dec. 28, 1978 now abandoned.

CROSS REFERENCE TO RELATED APPLICATION

This application is related to my application Ser. No. 966,196 filed Dec. 4, 1978 and titled "Method and Apparatus for Separating Neutral Molecules Using a Bipolar Membrane as a Molecular Sieve", the now U.S. Pat. No. 4,225,412, entire disclosure of which is incorporated herein by this reference.

BACKGROUND OF THE INVENTION

Bipolar membranes exhibit many of the electrical characteristics of a p,n-junction. The bipolar membrane has a basic structure comprising two regions consisting of an ion exchange resin. Both regions are of an ionizable species, one region being of a kind which ionizes to yield mobile negative ions and immobile positive ions, while the other region is of the type which ionizes to yield positive mobile ions and negative immobile ions. Diffusion of mobile ions across the junction between the two regions produces a space charge region which is substantially free of mobile ions. The bipolar membrane in terms of its electrical characteristics has been analyzed in the prior art literature. See, for example, the article "Voltage Current Characteristics of Bipolar and Three-Layer Fixed Charge Membranes" by R. Simons, Biochimica Et Biophysics, Acta, 282 (1972) pages 72–79; "Space Charged Regions, Fixed Charge Membranes and the Indicated Property of Capacitance" by A. Mauro, Biophysical Journal 2: 179 (1962). Such bipolar membranes have been constructed by pressing together two strong acid and strong base membranes into a sandwich. A novel method of preparing a sandwich-type bipolar membrane is reported in Chemical Abstracts, Vol., 81, 176899 m (1974), where a conventional ion-selective membrane, of either the cationic or anionic type, is placed in an electrolytic cell with finely ground ion exchange resin of the opposite selectivity, and a d.c. current applied across the cell to firmly coat the membrane with resin. More recently, a monolithic bipolar membrane has been produced in a single sheet of polyethylene which is hydrolyzed on one side by an NaOH solution in water and is aminated on the other side by a diamine or a polyamine. Such a bipolar membrane is described in detail in the article "Bipolar Membranes Made of a Single Polyolephine Sheet" by F. de Korosy and E. Zeigerson, Israel Journal of Chemistry, Vol. 9, 1971, pp. 483–497. With a cellulosic, non-ion exchange membrane and with a sodium styrene sulfonate ion exchange membrane, the selectivity for thiourea and urea has been changed by physically stretching the membrane, see M. E. Bogdanov and A. A. Efendiev, *Ajob* Khim. Zh. 4:103, (1975).

SUMMARY OF THE INVENTION

The present invention is directed to the use of bipolar membranes as an electromechanical device, and more particularly, as a molecular sieve which can be controlled by an externally applied electric field to selectively pass molecules of different materials. Specifically, it has been determined that a bipolar membrane having, at best, the elastic characteristics of a rubber may become strained and distorted by application of an external electric field across the membrane. Porosity control, by the present invention, can also be achieved with membranes which are much less elastic than an ideal rubber. This effect can be used to control the migration of molecules of different materials through the membrane by changing the selectivity.

In brief, the present invention provides a molecular sieve for separating differing species of molecules comprised of a bipolar membrane of an elastomeric material wetted with a medium comprising an electrolyte or a polar solvent, such as water or liquid ammonia. Electrodes on either side of the membrane are used to apply an electric field across the membrane. So that electrical contact between the electrodes and the membrane can be made, the medium should have some minimal conductivity. High conductivity, however, is unnecessary, since the separation of neutral species does not depend primarily on the flow of electrical current but only upon applicability of a potential. By adjusting the magnitude of the electric field, the membrane material within the space charge region can be compressed or expanded. Changing the compressive state changes the solvent content of the membrane, its pore size distribution, and the ability of molecules to pass through the membrane by diffusion. Molecules of different gaseous materials on one side of the membrane can thus be isolated with variable controllable selectivity by being allowed to pass through to the opposite side of the membrane. The control of the applied field affects the selectivity of the separation between two or more gaseous materials, or provides a valving action for a single material.

BRIEF DESCRIPTION OF THE DRAWINGS

For a more complete understanding of the invention reference should be made to the accompanying drawings, wherein.

DETAILED DESCRIPTION

Figure 1:
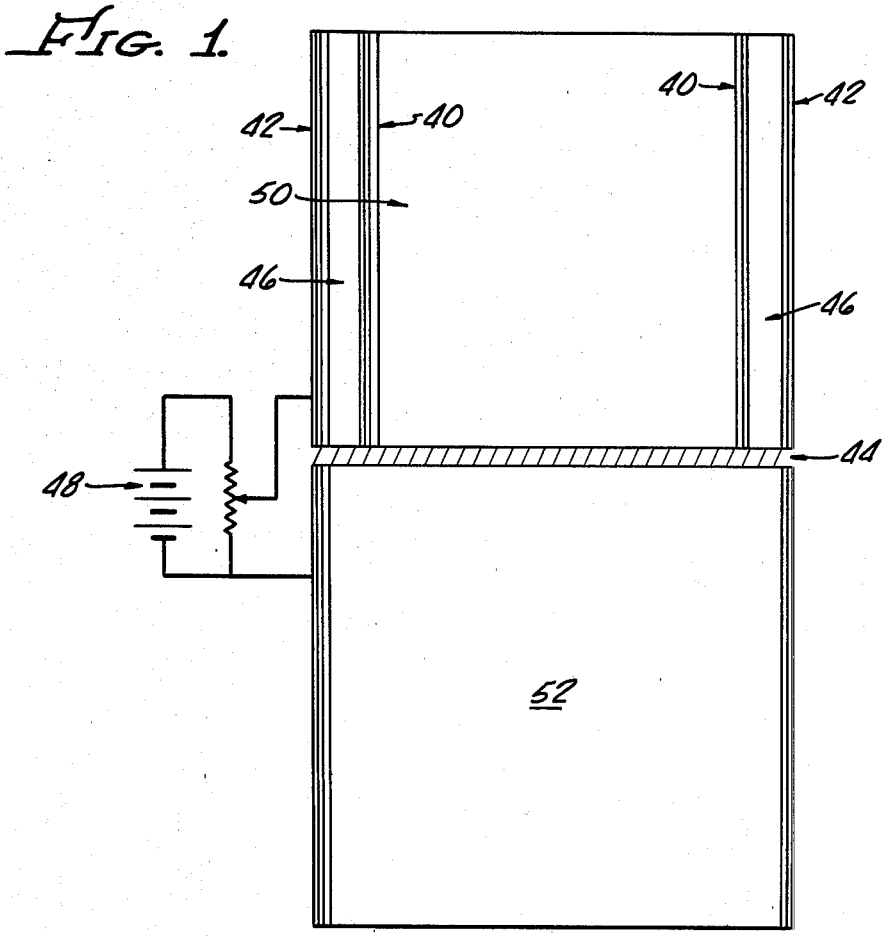
FIG. 1 is a side view diagram of an apparatus for separating gases by means of the present invention.

FIG. 1 illustrates an apparatus which can be used in the present invention and is discussed more fully later.

Figure 2:
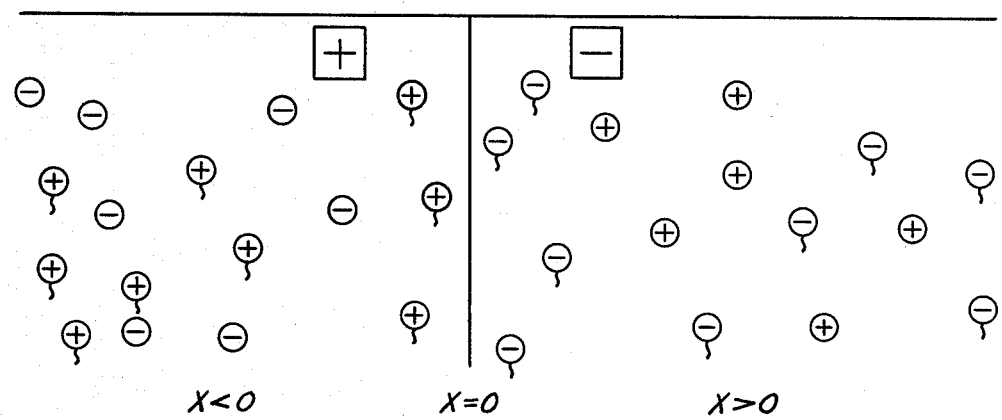
FIG. 2 is a diagrammatic showing of bipolar membrane junction.
Figure 3:
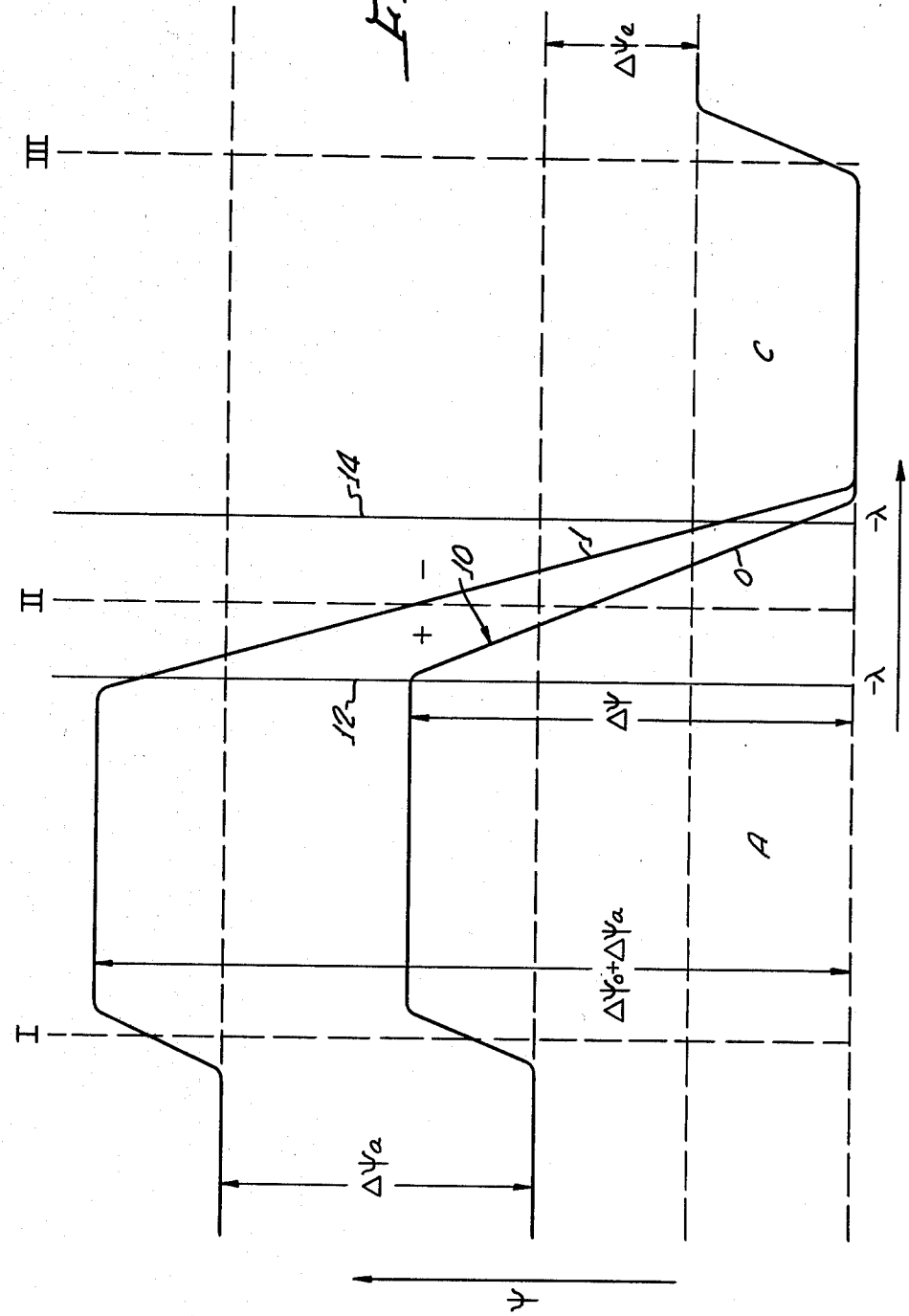
FIG. 3 is a diagram showing the potential distribution within the bipolar membrane.

Referring to FIGS. 2 and 3, there is illustrated in FIG. 2 schematically a small section of a monolithic bipolar membrane of the type described, for example, in the above-identified article by de Korosy. The ideal monolithic bipolar membrane has two regions extending on either side of an imaginary plane, located at $x=0$ in FIG. 2. In actual practice graded distributions of anionic and cationic groups can be used in the present invention. One region is formed of an ionizable resin species which yields mobile negative ions, that is, anionic counter ions, shown as the region for which the position coordinate is $x<0$. The other species ionizes to yield mobile positive ions, that is, cationic counterions, shown as the region where the position coordinate is $x>0$. Thus a junction is formed at $x=0$ between the two regions. The first species also contains fixed or pendant ions which are positive in the region $x<0$, while the second species comprises pendant negative ions in the region $x>0$. These pendant or fixed ions are attached to the backbone of the membrane structure. In FIG. 2 the fixed pendant ions are shown with "tails" while the mobile counterions are indicated by circles without tails. It will be noted that because the mobile ions of each region can diffuse out of their respective regions until the field generated by this charge transfer halts the process, there is produced a region on either side of $x=0$ in FIG. 2 which is depleted in mobile ions. This produces $+$ and $-$ space charges on either side of the $x=0$ as indicated in the two squares in FIG. 2. In FIG. 3 the boundaries of this space charge region (which as an approximation are shown as abrupt) are indicated at $-\lambda$ and $+\lambda$. The width of this "double layer" space charge region depends on the voltage across the junction and vice versa.

When the membrane is wetted with an aqueous solution, the membrane becomes swollen by the absorption of water and the mobile counterions are contained within this absorbed water. The absorbed water (or other solvent) may usually be considered as occupying pores in the membrane structure. FIG. 3 shows a plot of the variation in the electrical potential through a cross-section of the bipolar membrane immersed in water. The vertical lines at I and II represent the outer boundaries of the bipolar membrane and the surrounding water. The region in the membrane indicated by A represents the region of anionic counterions, while the region indicated at C represents the region of cationic counterions.

It will be seen from FIG. 3 that the electrical potential varies with position x as indicated by the curve marked "0". The curve marked "1" indicates the variation of potential when an external potential $\Delta\Psi a$ is applied in the "reverse" direction across the membrane, that is, the direction in which the mobile ions on each side of the junction are driven away from the junction by the applied field so as to widen the depletion region and reduce the conductivity of the membrane. It will be seen that the bipolar membrane has many of the characteristics of a p,n-junction. Thus increasing the potential in the reverse direction, by widening the depletion region $-\lambda$ to $+\lambda$, increases the resistance and the capacitance of the junction. With a potential applied in the forward direction most of these effects are inverted and the junction becomes conductive to current flow by the "injection" across the junction of co-ions (or minority carriers) whose fluxes are determined by diffusion alone.

It is worthwhile to provide a schematic of the variation of the electrical potential throughout this system for the case where the Donnan potential is not overwhelmed. In FIG. 3 the three junctions, I, II, and III, are between external solution and anionic membrane, anionic and cationic membrane (the junction), and cationic membrane and external solution respectively. The anionic and cationic membranes are indicated by the letters A and C. The solid vertical lines, labeled $-\lambda$ and $\lambda$ respectively are the (approximately defined) boundaries, in the absence of an applied potential, of the depletion layer (typical of a p,n-junction) in which there are negligible concentrations of mobile ions and where the $+$ and $-$ space charges (indicated by $+$ and $-$ in FIG. 3) are due to the fixed ions.

Electrical potential $\Psi$ increases vertically in FIG. 3 and with no external applied potential its variation with position x is indicated by the solid curve labeled 0. The first change in potential, due to the Donnan phenomenon, occurs at interface I and is positive. The "bipolar" potential variation $\}\Psi$ occurs at interface II and is negative. The variation at interface III is again Donnan in origin and is positive. The total variation in potential is denoted by $\Delta\Psi e$.

The curve labeled 1 indicates the variation of potential when an external potential, $\Delta\Psi a$, is applied to the system in the "reverse" direction. The reverse direction corresponds to the high resistance branch of the rectifying characteristic and in this direction the mobile ions on each side of the junction are driven away from the junction widening the depletion region (increasing the magnitude of $\lambda$) and requiring that the current in the depletion region (which is rate controlling) be carried, for example, when water is the medium, by $H^+$ and $OH^-$ ions derived by the "splitting" of water. The widened depletion region is not explicitly delineated in the Figure but can be discerned from the increased breadth of the sloped region of curve 1 in the neighborhood of the junction.

The monolithic membrane material is elastomeric, exhibiting some of the elastic properties of rubber, for example. The intense field produced by the potential change across the double-layer space charge region $-$ to $+$ operates to exert a physical stress on the polymer material through its action on the pendant ions. Referring to FIG. 2, it can be seen that in the neighborhood of the junction the material on the left ($x<0$) will be "pulled" by the electric field toward the right, while the opposite will be true of the material on the right of the junction. This effect occurs only within the space charge layer between $x=-\lambda$ and $x=+\lambda$. As a result the elastomeric material of the bipolar membrane within the space charge layer is physically compressed in the x direction and the strain or deformation is a function of X. The material of the membrane outside of the space charge layer remains unstrained but the part to the left of $x=-\lambda$ will be translated to the right, while the part to the right of the $x=+\lambda$ will be translated to the left. If an external field is applied which produces a potential in the "forward" direction, the compressive effect is reduced and if an external field is applied which is in the "reverse" direction, the compressive effect is enhanced.

While the physically measurable changes in the thickness of the membrane are small, being under the best conditions on the order of 0.15 microns with an applied field potential of 10 volts, substantial effects on the ability of the membrane to pass, reject, and discriminate among molecules with small changes in the applied field are possible.

The polarity of the external field as applied to the junction is in the "reverse" direction, that is, in the direction which reduces the number of mobile ions in the double layer or space change region. However, the polarity of the field may also be applied in the forward direction to further reduce the compression effect on the space charge region due to the internal field in the space charge region, which accounts for a potential difference on the order of 0.7 volts.

As the applied field is increased in the reverse direction across the membrane, the pore size distribution in the membrane is changed. Also some water is squeezed out of the double layer region by the compressive effect described above. Furthermore there can be an orientational effect on polar neutral molecules (see FIG. 4). At the same time the double layer region develops an altered, selective permeability to the gaseous molecules.

Thus the selective transfer rate of molecules through the membrane, i.e., the porosity of the membrane, can be controlled by merely adjusting the level of the applied field. This response is different for different molecules. The bipolar membrane may therefore be considered as a molecular sieve or separator where selectivity can be adjusted by the level of the applied field.

Figure 4:
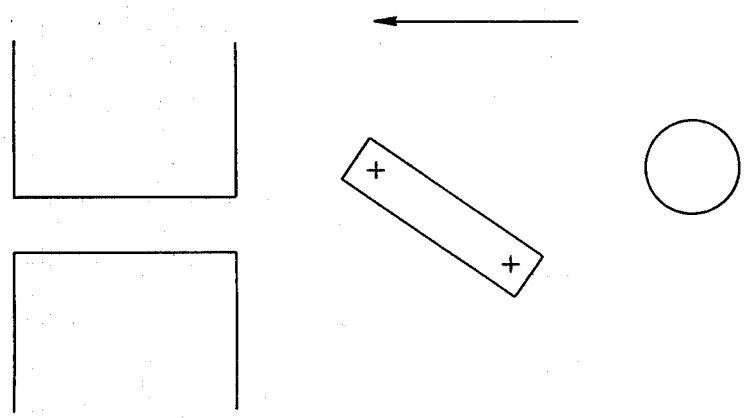
FIG. 4 is a diagram showing one effect of orientation of a polar molecule in a field.

FIG. 4, herein, illustrates a possible situation in which the field can assist the separation of a rod-like molecule with a dipole moment from a more spherical non-polar molecule. Even if the pore size is not changed by the field, the partial orientation of the rod-like molecule by the field can enable it to slip through the pore where the spherical molecule cannot. This emphasizes the fact that more than changes in pore shape and size distribution can be involved in the separation of certain molecular species.

An apparatus can be constructed for using the membranes to separate components of a gas mixture. In FIG. 1, for example, one cylindrical tube 40 can be placed within another cylindrical tube 42 of somewhat larger diameter and a bipolar membrane 44 attached to one end of both cylinders. A suitable liquid medium e.g., an aqueous solution, introduced into the space 46 between the walls of the two cylinders can be used to wet the membrane. A mixture of gases which are to be separated is introduced into the inner cylinder 50 and a voltage 48 (shown here as, but not limited to, a battery and variable resistance device) applied in the reverse direction across the membrane. The membrane will most often, but not always (depending upon the particular molecules) operate to block migration of the gas molecules across the membrane and into receptacle 52. By reducing the level of the field in the reverse direction, a level can be found at which one of the gaseous materials will be selectively passed by the membrane so that the one material will be more concentrated in the receptacle relative to the other materials in the original mixture. This process can be repeated in successive stages at different potential levels to provide separation of other materials from the same mixture.

The liquid medium used to wet the membrane should be capable of dissolving the gas molecules which are to be passed through the membrane, since transport through the swollen membrane will be facilitated if the gas is soluble in the liquid which fills the membrane pores. Permeation, which is measure of the rate at which gas is transferred across the membrane, is a function of both the diffusion coefficient and solubility of the gas. Gases which have a higher diffusion coefficient with a particular membrane can have a lower solubility in the liquid medium than gases with a lower diffusion coefficient, while maintaining a given permeation.

An amount of the solvent used in the liquid medium should be present at the saturation level, in the gaseous phase, as a component of the gas mixture which is introduced to the apparatus for separation, to prevent excessive evaporation of the liquid medium. For example, when the liquid medium is an aqueous solution, a high relative humidity should be present in the feed gas.

Such an apparatus as that of FIG. 1 has a definite advantage for gas separation over that disclosed in my application Ser. No. 966,196, in which the materials to be separated are dissolved in a bulk solution phase, since the feed gas is delivered directly to the surface of the membrane and needs not diffuse through a quantity of liquid. The result is a greatly reduced resistance to transport.

The membrane permeation (product of solubility and diffusivity) can be increased by increasing the pressure of the gaseous solution being separated.

While the apparatus of FIG. 1 illustrates the use of a single membrane to selectively pass one material, the apparatus could be made with any number of membranes arranged in stages to separate a number of different materials in gaseous solution, each stage selectively blocking one constituent and passing the balance of materials.

Fixed porosity membranes have been used to separate a variety of gaseous species, and are well known to the art. A report of a large scale test for recovering helium from natural gas by diffusion through membranes is found in Hwang, et al. "Membranes in Separations", John Wiley and Sons, Inc., 1975, pages 461–464. Also reported in the same volume, at pages 459–461, is a system for recovering hydrogen from refinery gases. Miroporous membranes have also been used for isotope separations, as in the enrichment of $^{235}U$ by gas diffusion of the uranium fluorides, mentioned by Hwang, et al., at page 500. Such separations can be performed by means of the process and apparatus described herein.

What is claimed is:

1. A molecular separator with electrically adjustable controlled selectivity for separating one type of gaseous molecules from a mixture of different types of gaseous molecules comprising; a bipolar membrane having a pore size distribution therein dependent upon an electric field applied thereacross, means for wetting both sides of the bipolar membrane with a liquid medium, means for applying an electric field across the membrane, means for applying a mixture of different types of gas molecules to one side of the bipolar membrane, and means for adjusting the magnitude of the electric field to vary the pore size distribution of the bipolar membrane and enable the one type of gaseous molecule to pass through the bipolar membrane and prevent other types of gaseous molecules from passing through the bipolar membrane.

2. Apparatus of claim 1 wherein the bipolar membrane is formed from elastomeric materials.

3. Apparatus of claim 1 wherein the bipolar membrane comprises a single sheet of a polyolefin material treated to provide a cation selective region and an anion selective region.

4. Apparatus of claim 1 wherein both sides of the bipolar membrane are wetted in an aqueous solution.

5. A process for separating one type of gaseous molecules from a mixture of different types of gaseous molecules comprising the steps of: applying a mixture of different types of gaseous molecules to one side of a porous bipolar membrane having a pore size distribution dependent upon an applied electric field, wetting both sides of the porous bipolar membrane with a liquid medium, applying an electric field across the porous bipolar membrane, and adjusting the electric field to a level causing the pore size distribution of the porous bipolar membrane to pass one type of molecule and to block the passage of other types of molecules in said mixture of different types of molecules, the passage of one type of molecule through the porous bipolar membrane being by diffusion.

6. The process of claim 5 in which the electric field is applied with a polarity in the directions of maximum resistance to current flow through the porous bipolar membrane.

7. The process of claim 5 in which the electric field is initially applied at a level at which substantially no diffusion through the porous bipolar membrane of the one type of gaseous molecules, and reducing the level of the applied electric field until diffusion of the one type of gaseous molecules takes place.

8. A molecular separator with electrically adjustable controlled selectivity for separating gaseous molecules of different types comprising: a porous bipolar membrane having a pore size distribution dependent upon an applied electric field; means for applying an electric field across the membrane; means for wetting both sides of the porous bipolar membrane; means for applying a mixture of different types of gas molecules to one side of the porous bipolar membrane; and means for adjusting the magnitude of the electric field to vary the pore size distribution of the porous bipolar membrane to enable one type of gaseous molecule from the mixture of different types of gas molecules to pass through the porous bipolar membrane while preventing other types of gaseous molecules from the mixture of different types of gas molecules from passing through the porous bipolar membrane.

9. A molecular separator with electrically adjustable controlled selectivity for separating gaseous molecules of different types comprising: a porous bipolar membrane having a pore size distribution dependent upon an applied electric field; means for applying an electric field across the membrane; means for wetting both sides of the porous bipolar membrane; means for applying a mixture of different types of gas molecules to one side of the porous bipolar membrane, said different types of gas molecules having different sizes; and, means for adjusting the magnitude of the electric field to vary the pore size distribution of the porous bipolar membrane to enable a smaller size of gaseous molecule from the mixture of different types of gas molecules to pass through the porous bipolar membrane while preventing larger size gaseous molecules from the mixture of different types of gas molecules from passing through the porous bipolar membrane.

10. A molecular separator with electrically adjustable controlled selectivity for separating a gaseous molecule from different gaseous molecules comprising: a porous bipolar membrane of an electromeric material; means for wetting both sides of the membrane with a liquid medium; means for applying an electric field across the membrane; means for adjusting the porosity of such bipolar membrane which comprises means for varying the magnitude of the electric field; means for applying a gas containing such gaseous molecule to one side of the one membrane; and, means for receiving such gaseous molecule selectively passed by the bipolar membrane.

11. Apparatus of claim 8, 9, or 10 wherein the porous bipolar membrane comprises a single sheet of a polyolefin material treated to provide a cation selective region an an anion selective region.

12. Apparatus of claim 8, 9, or 10 wherein the porous bipolar membrane is wetted by an aqueous solution.

13. A process for separating a mixture of different gaseous molecules by the size of such molecules, comprising the steps of: applying said mixture of different gaseous molecules to one side of a porous bipolar membrane of an elastomeric material, said porous bipolar membrane having a pore size distribution dependent upon an applied electric field; wetting both sides of the membrane with a liquid medium; applying an electric field across the porous bipolar membrane; and, adjusting the porosity of said porous bipolar membrane by varying the magnitude of the electric field causing the pore size distribution of the membrane to pass molecules of one size in said mixture more selectively than in the absence of said electrical field.

14. The process of claim 13 in which the electric field is applied with a polarity in the direction of maximum resistance to current flow through the membrane.

15. The process of claim 13 in which the electric field is initially applied at a level in which substantially no diffusion through the membrane of the gaseous molecules on one side of the membrane takes place, and reducing the level of the applied field until diffusion of the relatively smaller sized gaseous molecules takes place.

* * * * *